(12) United States Patent
Kamitani et al.

(10) Patent No.: US 8,831,908 B2
(45) Date of Patent: Sep. 9, 2014

(54) SIGNAL PROCESSING APPARATUS USED FOR OPERATIONS FOR RANGE FINDING AND SCANNING RANGEFINDER

(75) Inventors: Toshihiro Kamitani, Nishinomiya (JP); Toshihiro Mori, Takatsuki (JP)

(73) Assignee: Hokuyo Automatic Co., Ltd., Osaka (JP)

( * ) Notice: Subject to any disclaimer, the term of this patent is extended or adjusted under 35 U.S.C. 154(b) by 657 days.

(21) Appl. No.: 13/075,668

(22) Filed: Mar. 30, 2011

(65) Prior Publication Data

US 2011/0246116 A1 Oct. 6, 2011

(30) Foreign Application Priority Data

Mar. 31, 2010 (JP) ................. 2010-083540

(51) Int. Cl.
| | | |
|---|---|---|
| *G01C 3/00* | (2006.01) | |
| *G01B 11/14* | (2006.01) | |
| *G06F 19/00* | (2011.01) | |
| *G06F 17/40* | (2006.01) | |
| *G01S 7/487* | (2006.01) | |
| *G01S 7/486* | (2006.01) | |
| *G01S 7/497* | (2006.01) | |
| *G01S 17/42* | (2006.01) | |

(52) U.S. Cl.
CPC .............. *G01S 7/487* (2013.01); *G06F 19/00* (2013.01); *G01C 3/00* (2013.01); *G01B 11/14* (2013.01); *G06F 17/40* (2013.01); *G01S 7/4865* (2013.01); *G01S 7/497* (2013.01); *G01S 17/42* (2013.01); *G01S 2007/4975* (2013.01)
USPC .......................................... 702/159; 356/5.01

(58) Field of Classification Search
CPC ............ G01B 7/00; G01B 7/003; G01B 7/02; G01B 7/14; G01B 11/00; G01B 11/026; G01B 11/14; G01B 15/00; G01B 17/00; G01B 21/02; G01B 21/16; G01B 7/023; G01B 11/02; G01B 21/00; G01C 3/00; G01D 7/00; G01D 9/00; G01D 21/00; G01S 13/00; G01S 13/02; G01S 13/04; G01S 13/06; G01S 15/00; G01S 15/02; G01S 15/04; G01S 15/06; G01S 17/00; G01S 17/02; G01S 17/06; G01S 17/08; G01S 2007/02; G01S 2007/027; G01S 2013/00; G01S 2015/00; G01S 2015/02; G01S 2015/88; G06F 11/00; G06F 11/32; G06F 11/34; G06F 17/00; G06F 17/40; G06F 19/00
USPC ......... 73/43.1, 865.8; 181/123, 124; 250/200, 250/336.1, 370.01, 370.1, 559.01, 559.29; 340/500, 540, 686.1, 686.6; 342/118; 356/3, 4.01, 5.01, 614; 367/87, 99, 367/118, 127, 128; 702/1, 127, 150, 155, 702/158, 166, 187, 189; 708/100, 105, 200
See application file for complete search history.

(56) References Cited

U.S. PATENT DOCUMENTS

| | | | |
|---|---|---|---|
| 3,164,661 A * | 1/1965 | Dellon | 356/5.1 |
| 3,387,256 A | 6/1968 | Warner et al. | |
| 3,424,531 A * | 1/1969 | Owens et al. | 356/4.1 |
| 3,520,611 A * | 7/1970 | Picou | 356/72 |
| 4,135,161 A | 1/1979 | Torrieri | |
| 4,413,905 A * | 11/1983 | Holzapfel | 356/5.1 |
| 6,650,404 B1 * | 11/2003 | Crawford | 356/5.01 |
| 7,408,628 B2 * | 8/2008 | Nakamura | 356/5.01 |
| 2007/0291249 A1 * | 12/2007 | Nakamura | 356/4.01 |
| 2009/0135405 A1 | 5/2009 | Fischer et al. | |

FOREIGN PATENT DOCUMENTS

| | | |
|---|---|---|
| EP | 0145221 | 8/1988 |
| EP | 1 901 092 | 3/2008 |
| EP | 2372389 A1 * | 10/2011 |
| GB | 1 599 459 | 10/1981 |
| JP | 2007-256191 | 10/2007 |
| JP | 2008-070159 | 3/2008 |

OTHER PUBLICATIONS

Japanese Office Action dated Feb. 18, 2014 for Appln. 2010-083540.
European Search Report dated Jul. 19, 2011 for Appln No. 11159480.0-2220.

* cited by examiner

*Primary Examiner* — Edward Cosimano
(74) *Attorney, Agent, or Firm* — Pillsbury Winthrop Shaw Pittman, LLP

(57) ABSTRACT

A signal processing apparatus includes a differential processing unit to differentiate a reflection signal corresponding to a pulse measurement beam that is periodically scanned in a polarized manner; an arithmetic unit to obtain, with a rising time of a first-order-differential reflection signal as a reference, a barycentric position of the first order differential reflection signal as a detection time of a reflected beam, and to calculate a distance to a measured object based on a time difference between an output time of the measurement beam and the detection time of the reflected beam; and a waveform determining unit to determine whether the reflected beam includes a plurality of overlapping reflected beams from a plurality of measured objects, based on rising and falling characteristics of the first-order-differential reflection signal and based on a rising characteristic of a second-order-differential reflection signal obtained by the second order differential of the reflection signal.

23 Claims, 13 Drawing Sheets

SIGNAL PROCESSING APPARATUS USED FOR OPERATIONS FOR RANGE FINDING AND SCANNING RANGEFINDER

This application is based on an application No. 2010-83540 filed in Japan, the contents of which are hereby incorporated by reference.

BACKGROUND OF THE INVENTION

1. Field of the Invention

The present invention relates to a signal processing apparatus used for operations for range finding and to a scanning rangefinder. In particular, the present invention relates to a signal processing apparatus that is suitable for a scanning rangefinder based on a TOF (Time of Flight) method, which includes a light emitting unit to output a pulse measurement beam, a scanning unit to periodically scan the measurement beam output from the light emitting unit in a deflected manner to a measurement target space through an optical window, a light receiving unit to detect a reflected beam reflected from a measured object present in the measurement target space, and an arithmetic unit to calculate and output a distance to the measured object based on a time difference between an output time of the measurement beam and a detection time of the reflected beam.

2. Description of the Related Art

Scanning rangefinders of this type are used for vision sensors of robots or unmanned transfer vehicles, door open-close identification sensors, monitor sensors to detect presence or absence of intruders in monitoring areas, and safety sensor to detect people or objects approaching dangerous mechanical apparatuses and to safely stop the mechanical apparatuses.

Japanese Unexamined Patent Application Publication No. 2008-70159 and Japanese Unexamined Patent Application Publication No. 2007-256191, the contents of which are incorporated herein by reference in their entirety, propose a scanning rangefinder as described below.

The scanning rangefinder includes a light emitting unit to output a pulse measurement beam, a scanning unit to periodically scan the measurement beam output from the light emitting unit in a deflected manner to a measurement target space through an optical window, a light receiving unit to detect a reflected beam reflected from a measured object present in the measurement target space and output a corresponding reflection signal, a differential processing unit to differentiate the reflection signal output from the light receiving unit, and an arithmetic unit to calculate a barycentric position of a first-order-differential reflection signal based on a rise time of the first-order-differential reflection signal obtained by first order differential by the differential processing unit, to obtain a time corresponding to the barycentric position as a detection time of the reflected beam, and to calculate and output a distance to the measured object based on a time difference between an output time of the measurement beam and a detection time of the reflected beam.

When a measured object positioned in a predetermined direction is measured with the scanning rangefinder described above, semi-transparent reflection objects such as pieces of glass may exist, or objects, such as branches of trees, that are smaller than the beam of light of the measurement beam may exist between the scanning rangefinder and a measured object that is truly targeted for detection, that is, a target measured object. Further, an optical window from which the measurement beam is emitted may be unclear and contaminated.

In this case, there is a problem in that the distance to the target measured object may not be accurately calculated, since the scanning rangefinder detects not only the reflected beam reflected from the target measured object but also reflected beams reflected from semi-transparent reflection objects such as pieces of glass, branches of trees, or further from an unclear and contaminated optical window.

Therefore, considering the case of slight intensities of the reflected beam reflected from semi-transparent reflection objects such as pieces of glass or branches of trees, a conventional scanning rangefinder is configured to include a noise filter that eliminates the reflected beam in slight intensity as noise light, so as to remove the reflected beam in slight intensity from a reflected beam targeted for the distance arithmetic.

However, when the measured objects causing the noise light, such as semi-transparent reflection objects and branches of trees, exist near the target measured object, it is impossible to determine whether the reflected beam includes the noise light and to eliminate the noise light by means of a conventional noise filter for the reason that the reflected beams reflected from a plurality of measured objects are incident on the scanning rangefinder as overlapping continuous light.

Therefore, there has been a problem in that a distance calculated by the arithmetic unit based on the reflected beam including the overlapping reflected beams reflected from the plurality of measured objects does not correspond to a correct distance to the target measured object.

Moreover, there has been a problem in that, when the scanning rangefinder is used outdoors, the measurement target space is affected according to the weather. For example, there has been an apprehension in that, when a fog rises, or when snow or rain falls, part of the measurement beam reflected on the fog, snow, or rain is incident on the scanning rangefinder, so that the reflected beam including the noise light is erroneously recognized as a reflected beam reflected from the target measured object, only to calculate an erroneous distance.

SUMMARY OF THE INVENTION

In view of the foregoing problems, it is an object of the present invention to provide a signal processing apparatus and a scanning rangefinder that are capable of accurately calculating a distance to a target measured object, even when there exists an obstacle, which causes noise light, between the signal processing apparatus and the measured object.

According to one aspect of the present invention, a signal processing apparatus is configured to process a signal output from a rangefinder. The rangefinder includes a light emitting unit and a light receiving unit. The light emitting unit is configured to output a pulse measurement beam to a measurement target space through an optical window. The light receiving unit is configured to detect a reflected beam reflected from a target measured object present in the measurement target space and to output a reflection signal corresponding to the reflected beam. The signal processing apparatus includes a differential processing unit, a waveform determining unit, and an arithmetic unit. The differential processing unit is configured to differentiate the reflection signal output from the light receiving unit. The waveform determining unit is configured to determine whether the reflected beam includes a plurality of overlapping reflected beams reflected from a plurality of measured objects including the target measured object based on a rising characteristic and a falling characteristic of a first-order-differential reflection signal obtained by first order differential of the reflection signal by the differential processing unit and based on a rising characteristic of a second-order-differential reflection signal obtained by second order differential of the reflection signal by the differential processing unit. The arithmetic unit is configured to, in response to a determination of the waveform determining unit, calculate and output a distance to the target measured object based on the reflection signal.

According to another aspect of the present invention, the signal processing apparatus preferably includes a signal separating unit configured to separate the reflection signal with reference to a second rise time or the subsequent rise time on the second-order-differential reflection signal when the waveform determining unit determines that the reflected beam includes the plurality of overlapping reflected beams reflected from the plurality of measured objects.

In this case, the arithmetic unit is preferably configured to calculate a barycentric position of the first-order-differential reflection signal for the reflection signal separated by the signal separating unit with reference to the second rise time or the subsequent rise time on the second-order-differential reflection signal, to obtain a time corresponding to the barycentric position as a detection time of the reflected beam, and to calculate and output a distance to the target measured object based on a time difference between an output time of the measurement beam and a detection time of the reflected beam.

According to another aspect of the present invention, a signal processing apparatus is configured to process a signal output from a rangefinder. The rangefinder includes a light emitting unit and a light receiving unit. The light emitting unit is configured to output a pulse measurement beam to a measurement target space through an optical window. The light receiving unit is configured to detect a reflected beam reflected from a target measured object present in the measurement target space and to output a reflection signal corresponding to the reflected beam. The signal processing apparatus includes a differential processing unit, a waveform determining unit, and an arithmetic unit. The differential processing unit is configured to differentiate the reflection signal output from the light receiving unit. The waveform determining unit is configured to determine whether the reflected beam includes a plurality of overlapping reflected beams reflected from a plurality of measured objects including the target measured object based on a rising characteristic and a falling characteristic of a first-order-differential reflection signal obtained by first order differential of the reflection signal by the differential processing unit and based on a rising characteristic of a second-order-differential reflection signal obtained by second order differential of the reflection signal by the differential processing unit. The arithmetic unit is configured to, in response to a determination of the waveform determining unit, calculate a distance to the target measured object based on the reflection signal, and to output the distance only when the distance calculated for the measurement beam scanned in a deflected manner by a scanning unit in one same direction falls within a predetermined allowable range at a plurality of periods.

According to still another aspect of the present invention, a scanning rangefinder includes a light emitting unit, a scanning unit, a light receiving unit, and any one of the signal processing apparatuses. The light emitting unit is configured to output a pulse measurement beam. The scanning unit is configured to periodically scan the measurement beam output from the light emitting unit in a deflected manner to a measurement target space through an optical window. The light receiving unit is configured to detect a reflected beam including the plurality of overlapping reflected beams reflected from a plurality of measured objects including the target measured object present in the measurement target space and to output a reflection signal corresponding to the reflected beam. The signal processing apparatus is configured to process the reflection signal output from the light receiving unit and to calculate and output a distance to the target measured object.

Furthermore, other inventions will be apparent by referring to the embodiments described below.

DESCRIPTION OF THE EMBODIMENTS

Embodiments of the signal processing apparatus and the scanning rangefinder will be described with reference to the drawings.

Figure 1:
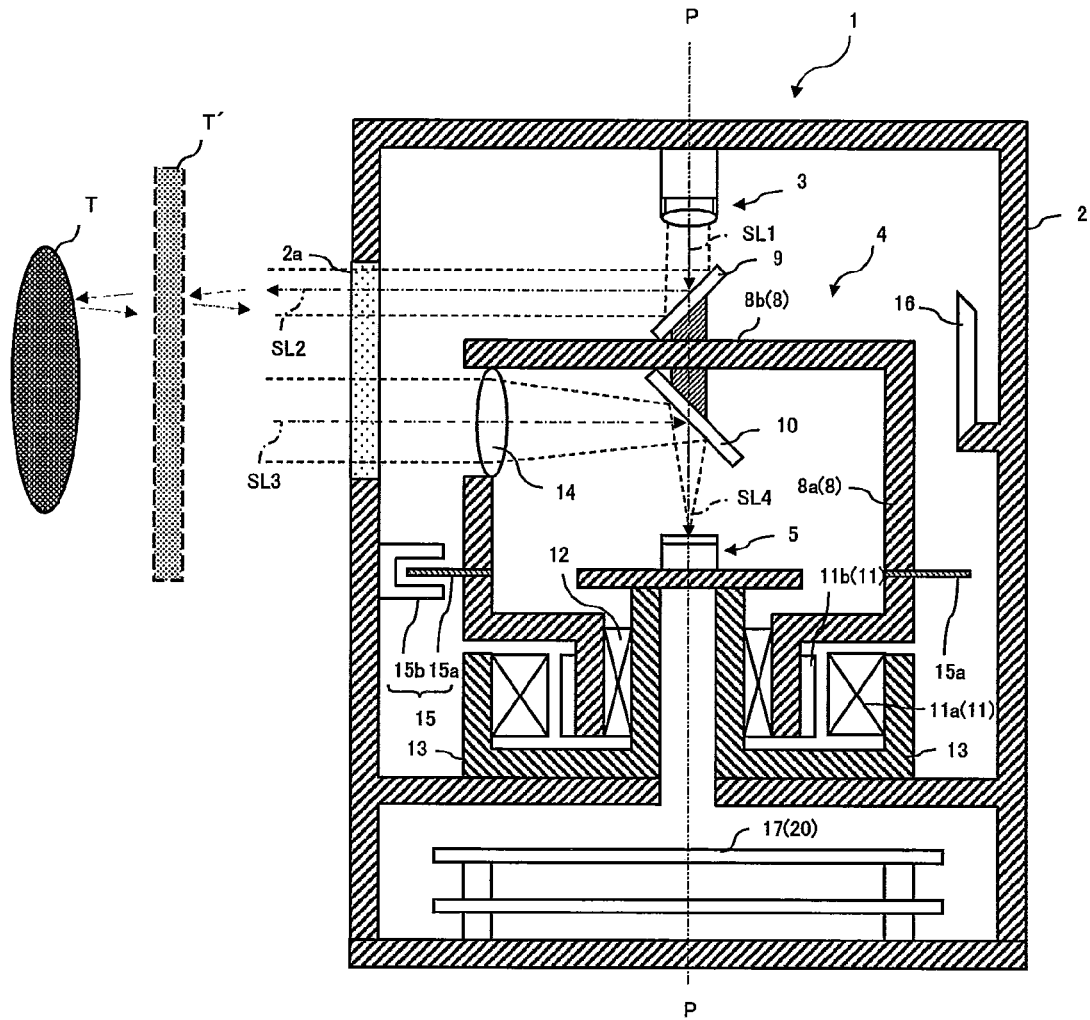
FIG. 1 is a schematic vertical cross-sectional view showing a scanning rangefinder according to an embodiment of the present invention illustrating a general arrangement of the scanning rangefinder.

As shown in FIG. 1, a scanning rangefinder 1 includes a cylindrical casing 2 that accommodates a pair of a light emitting unit 3 and a light receiving unit 5, an arc-shaped optical window 2a disposed along the circumferential direction of the casing 2, and a deflection optical system 4.

The deflection optical system 4 rotates a first deflection mirror 9 that reflects the measurement beam output from the light emitting unit 3 in a deflected manner in a direction perpendicular to a rotation axis P of the cylindrical casing 2 and rotates, about the rotation axis P, a second deflection mirror 10 that reflects the reflected beam reflected from a measured object in the deflected manner toward the light receiving unit 5, so as to rotatably scan the measurement beam on a surface perpendicular to the rotation axis P.

The inner-wall surface of the casing 2 is covered with a light absorbing material, such as a blackout curtain, to absorb stray light. The deflection optical system 4 is disposed between the light emitting unit 3 and the light receiving unit 5, which are disposed opposite to each other on the rotation axis P.

The light emitting unit 3 is fixed on top of the inner-wall surface of the casing 2, and includes a light emitting element of infrared semiconductor laser and an optical lens to convert a light beam output from the light emitting element into a light beam that is parallel to the rotation axis P.

The light receiving unit 5 is fixed on a supporting plate disposed on a hollow shaft 13 fixed on the casing 2 and includes a light receiving element of avalanche photodiode to detect the reflected beam.

The deflection optical system 4 includes a ceiling surface 8b where the first deflection mirror 9 and the second deflection mirror 10 are attached, a cylindrical rotation body 8 that includes a circumferential wall portion 8a where a light receiving lens 14 to condense the reflected beam received at the light receiving unit 5 is attached, and a motor 11 to drivingly rotate the rotation body 8 in one direction.

The rotation body 8 has a lower end portion reduced in diameter and is rotatably supported by the hollow shaft 13 through a bearing 12 provided in the inner circumferential surface of the hollow shaft 13. A magnet 11b, which is a rotor of the motor 11, is attached on the outer circumferential surface of the reduced-diameter portion. The motor 11 includes the rotor and a stator made of a coil 11a disposed opposite to the rotor. A cover of the stator is attached in the hollow shaft 13 fixed on the casing 2.

The measurement beam output from the light emitting unit 3 along an optical axis SL1 is deflected parallel to an optical axis SL2 perpendicular to the optical axis SL1, and irradiated to a measurement target space through the optical window 2a. A reflected beam reflected from a measured object T present in the measurement target space is incident on the light receiving lens 14 through the optical window 2a along an optical axis SL3 parallel to the optical axis SL2, deflected parallel to an optical axis SL4 orthogonal to the optical axis SL3 by the second deflection mirror 10, and condensed into the light receiving unit 5.

The measurement beam deflected by the first deflection mirror 9 passes through an upper area of the optical window 2a. The reflected beam reflected from the measured object T passes through a lower area of the optical window 2a.

A measurement scan angle range is a range in which the measurement beam is scanned by the deflection optical system 4, which is drivingly rotated by the motor 11, in the measurement target space through the optical window 2a; specifically, an angle range of about 270 degrees with respect to the described-above rotation axis P as a reference. A non-measurement scan angle range is an angle range in which the measurement beam is not output in the measurement target space due to the blocking of the casing 2.

In other words, the deflection optical system 4 constitutes a scanning unit that periodically scans the measurement beam output from the light emitting unit 3 in a deflected manner.

A disc-shaped slit plate 15a including a plurality of slits formed in the circumferential direction is attached to a circumferential wall portion 8a of the rotation body 8. A photo interrupter 15b to detect the slits is attached to the inner wall surface of the casing 2. The slit plate 15a and the photo interrupter 15b constitute a scan-angle detector 15 to detect the scan angles of the deflection optical system 4.

The slits formed in the slit plate 15a are arranged in equal intervals, except for slits at a reference position where the measurement beam is irradiated to the center of the non-measurement scan angle range. The intervals between the slits at the reference position are narrowly formed compared with the intervals between the other slits. Thus the position of rotation angle of the deflection optical system 4 from the reference position may be located on the basis of widths of pulses output from the scan-angle detector 15 when the deflection optical system 4 rotates.

As a reference optical system for distance correction, a prism 16 is provided in the center of the non-measurement scan angle range. A correction reference distance is calculated based on a reflected beam detected by the light receiving unit 5 through the prism 16.

A control board 17 including a signal processing circuit 20 to drive the scanning unit and calculate the distance to the measured object is disposed on a bottom portion of the casing 2.

Figure 5:
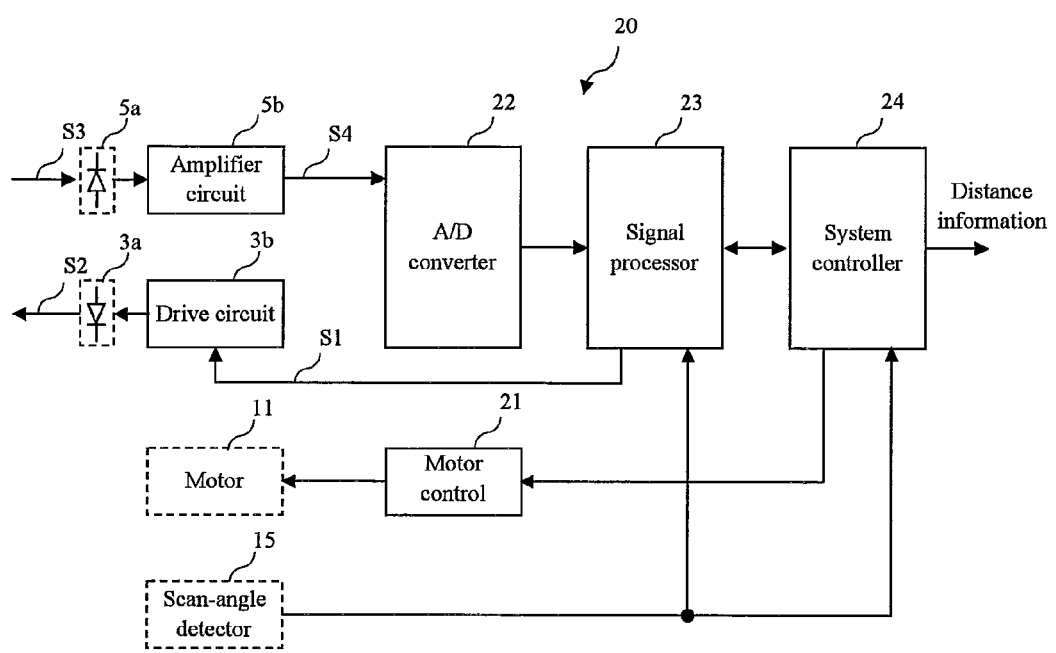
FIG. 5 is a block diagram of a control circuit of a scanning rangefinder.

As shown in FIG. 5, the signal processing circuit 20 includes a drive circuit 3b to drive a light emitting element 3a, an amplification circuit 5b to amplify a reflection signal photoelectrically converted from a reflected beam by the light receiving element 5a, an analog-to-digital (A/D) converter 22, a signal processor 23, a motor control circuit 21, and a system controller 24. The signal processor 23 and the system controller 24 constitute the signal processing apparatus of the embodiment of the present invention.

The system controller 24 includes a microcomputer. The microcomputer is run on a predetermined control program to control the signal processor 23, the motor control circuit 21, and other elements.

The system controller 24 detects a scan angle, namely, an irradiation direction of the measurement beam based on encoder pulses input from the scan-angle detector 15, and controls the motor control circuit 21 in such a manner that the measurement beam is periodically scanned to the measurement target space by the deflection optical system 4 at a constant and predetermined speed. The system controller 24 outputs distance information input from the signal processor 23 and measurement information on the scan angle and other parameters detected through the scan-angle detector 15, to an external apparatus through an interface connected between the external apparatus and the signal processing circuit 20.

Figure 2A:
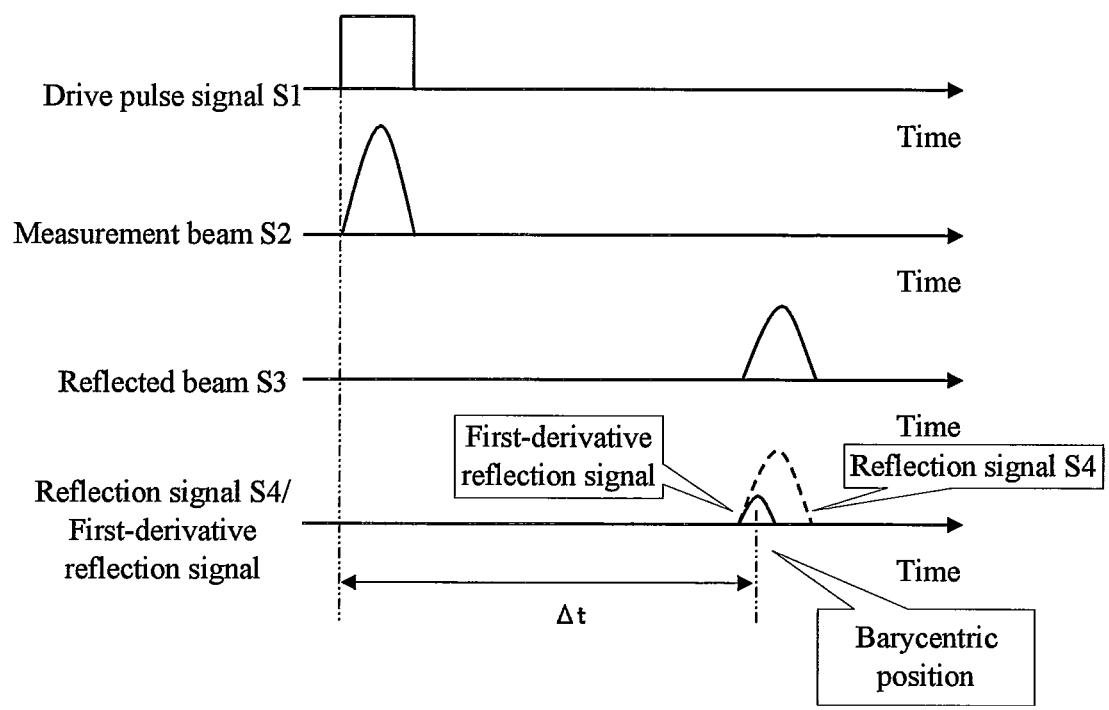
FIG. 2A is an explanatory diagram illustrating a principle of distance measurement that is based on a reflected beam reflected from a measured object.

As shown in FIG. 2A, an infrared semiconductor laser 3a is pulse-driven based on a drive pulse signal S1 output from the signal processor 23 to the drive circuit 3b, in synchronization with encoder pulses input from the scan-angle detector 15, so as to irradiate a pulse measurement beam S2 to the measurement target space.

The pulse measurement beam S2 is irradiated to the measured object, a reflected beam S3 reflected from the measured object is photoelectrically converted by an avalanche photodiode 5a, and a reflection signal S4 amplified by the amplification circuit 5b is input to the A/D converter 22.

A digital reflection signal that has been analog-to-digital converted by the A/D converter 22 is input to the signal processor 23. The signal processor 23 obtains a time difference Δt between the drive pulse signal S1 and the reflection signal and calculates a tentative distance D1 to the measured object based on a formula 1 below.

$$D1 = \Delta t \cdot C/2 \text{ (C is velocity of light)} \quad (1)$$

Meanwhile, when the encoder pulse input from the scan-angle detector 15 indicates the reference position, the measurement beam is irradiated to the prism 16, and the signal processor 23 calculates a reference distance D2 corresponding to a time difference Δt' based on the reflected beam S3 output from the prism 16 and detected by the avalanche photodiode 5a based on a formula 2 below.

$$D2 = \Delta t' \cdot C/2 \text{ (C is velocity of light)} \quad (2)$$

A distance D (=D1−D2) to the measured object is obtained by subtracting the reference distance D2 from the tentative distance D1. The reference distance D2 serves as a correction value to absorb a variation in characteristics of the infrared semiconductor laser 3a, the drive circuit 3b, the avalanche photodiode 5a, and other elements installed in the scanning rangefinder 1, and absorb a variation in measurement distances due to optical device differences, so as to calculate a correct distance to the measured object.

In the meantime, when a comparator that carries out comparisons using a predetermined threshold value is provided in order to detect the rise time of the reflection signal S4, the rise time of the reflection signal S4 may not be correctly detected because the output time of the reflection signal S4 from the comparator may vary under the influence of the intensity of the reflection signal S4 even if the time when the reflection signals S4 are generated are the same.

In view of this, the signal processor 23 is configured to carry out first order differential with respect to the reflection signal S4 to obtain a first-order-differential reflection signal, configured to calculate a barycentric position of the first-order-differential reflection signal based on a rise time of the first-order-differential reflection signal, and configured to obtain a time corresponding to the barycentric position as a detection time of the reflected beam S3

Figure 6:
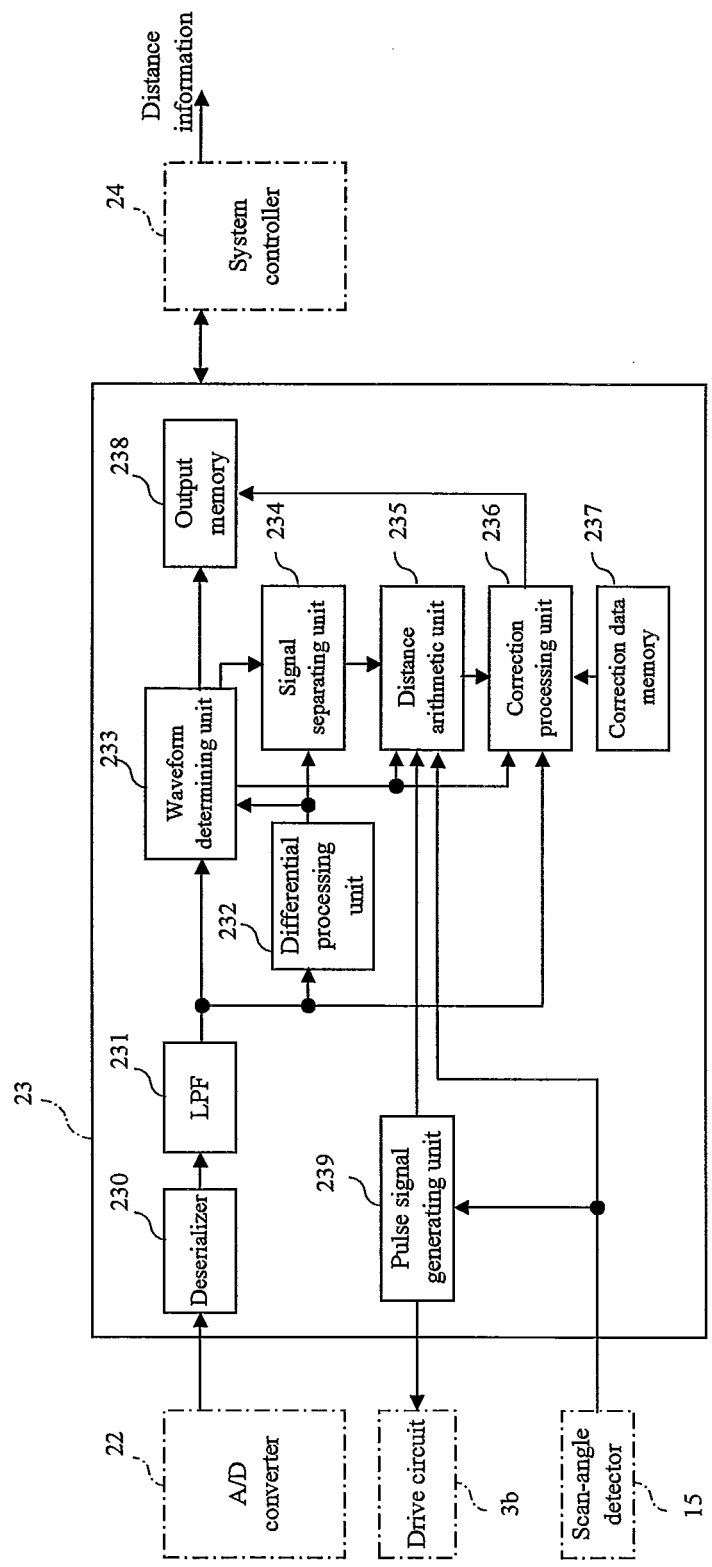
FIG. 6 is a block diagram of a signal processing unit, which is a part of a signal processing apparatus according to an embodiment of the present invention.

The signal processor 23 will be explained in details below. As shown in FIG. 6, the signal processor 23 includes integrated circuits, such as Application Specific Integrated Circuit (ASIC), including a signal-processing gate array and a digital signal processor. The signal processor 23 includes processing blocks such as a deserializer 230 to make parallelize A/D conversion signals in a line, a low-pass filter 231, a differential processing unit 232, a waveform determining unit 233, a signal separating unit 234, a distance arithmetic unit 235, a correction processing unit 236, a correction data memory 237, an output memory 238, and a pulse signal generating unit 239.

The pulse signal generating unit 239 is a processing block to output the drive pulse signal S1 to the drive circuit 3b and the distance arithmetic unit 235 in synchronization with the encoder pulses input from the scan-angle detector 15.

Digital reflection signals input from the A/D converter 22 are sorted by the deserializer 230 in time series and input to the differential processing unit 232 and the waveform determining unit 233 through the low-pass filter 231 to eliminate high frequency noise components.

The differential processing unit 232 carries out first-order and second-order-differential with respect to the reflection signal and outputs the first-order-differential reflection signal and the second-order-differential reflection signal to the waveform determining unit 233 and the signal separating unit 234.

Figure 2B:
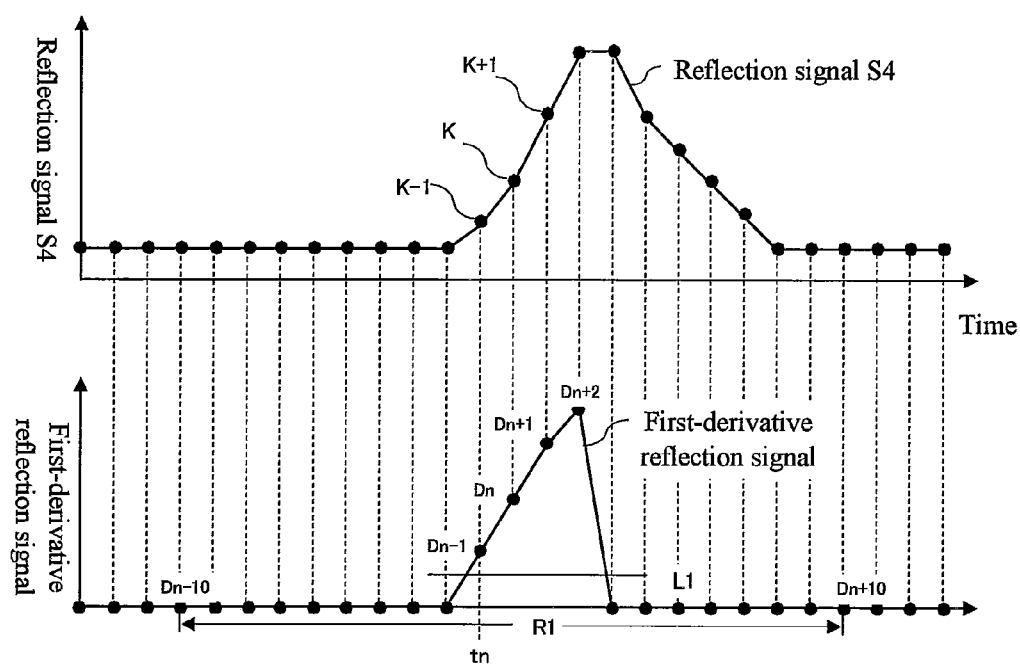
FIG. 2B is an explanatory diagram illustrating reflection signals.

FIG. 2B shows examples of signal waveforms of the reflection signal and the first-order-differential reflection signal.

The differential processing unit 232 obtains a difference value between a K-th sampling value (K is an integer showing a sampling order) and a (K−1)-th sampling value at each K-th sampling point, and calculates the first-order-differential reflection signal based on the difference value.

Further, the differential processing unit 232 obtains a difference value between the first-order-differential reflection signal obtained at each K-th sampling point and the first-order-differential reflection signal obtained at the (K−1)-th sampling point, and calculates the second-order-differential reflection signal based on the difference value. It is noted that in the present embodiment, a negative difference value is rounded off to zero to obtain the difference value within a positive area.

The waveform determining unit 233 subtracts, from a maximum level of the signals input through the low-pass filter 231, a minimum level of the signals before the measurement beam is output so as to calculate a first measurement threshold value L1 that is used to discriminate the reflection signal. The waveform determining unit 233, at the same time, calculates a mean level of the input signals as a second measurement threshold value L2 corresponding to an offset value.

In other words, the offset level of the amplification circuit 5b and the level of a noise signal caused by slight ambient light are calculated based on the signal samples obtained by the A/D converter 22 before the measurement beam is output.

The distance arithmetic unit 235 determines the rising edge of the drive pulse signal S1 input from the pulse signal generating unit 239 as the output time of the measurement beam. Further, the distance arithmetic unit 235 extracts signal components in an area exceeding the first measurement threshold value L1 from the first-order-differential reflection signal input form the differential processing unit 232, and calculates a barycentric position of the positive area (the differential waveform shown in FIG. 2B) as the rising timing of the reflected beam S3, namely, the detection time.

The distance arithmetic unit 235 calculates the tentative distance D1 to the measured object based on a time difference between the output time of the measurement beam and the detection time of the reflected beam, and adds one to the value of a counter that counts the number of drive pulse signals S1. It is noted that the counter value is reset for every one rotation of the scanning unit.

As shown in FIG. 2B, the distance arithmetic unit 235 detects two consecutive sampling points of the first-order-differential reflection signal exceeding the first measurement threshold value L1, and calculates a barycentric position G based on a formula 3 below, assuming a first-order-differential reflection signal value Dn of the second sampling point exceeding the first measurement threshold value L1 as a center and assuming, for example, 10 sampling points (n−10 to n+10) that are continuous back and forth at the hear of Dn, as a barycentric position arithmetic range R1.

In other words, the barycentric position G is calculated as time information based on the sampling point (n−10). It is noted that the selection of the sampling points contributing to the barycentric position arithmetic is not limited to the example described above. The sampling points contributing to the barycentric position arithmetic may be selected in such a manner that, assuming a first-order-differential reflection signal value Dn of the second sampling point exceeding the first measurement threshold value L1 as a center, the sampling points range from a sampling point immediately before the first-order-differential reflection signal value exceeds the first measurement threshold value L1 to a first sampling point where the first-order-differential reflection signal value drops beyond the first measurement threshold value L1.

$$P = \frac{D_{n-10} \cdot (n-10) + D_{n-9} \cdot (n-9) + \ldots + D_{n+10} \cdot (n+10)}{D_{n-10} + D_{n-9} + \ldots + D_{n+10}} \quad (3)$$

Thus when the reflection signal is subjected to first order differential and the barycentric position of the positive area is obtained as the rise time of the reflection signal, an approximately equal rise time is obtained even though the light quantity varies.

Moreover, the distance arithmetic unit 235 carries out similar processing as that described above to calculate the reference distance D2 with respect to the reflected beam S3 detected at the reference position through the prism 16 as a reference beam. The calculation of the reference distance D2 is performed for every rotation in synchronization with the rotation frequency of the scanning unit.

Every time the distance arithmetic unit 235 calculates the tentative distance D1, the correction processing unit 236 subtracts the reference distance D2, which is calculated immediately before the tentative distance D1 is calculated, from the tentative distance D1 so as to calculate the distance D, and then stores the value of the distance D and the counter value in the output memory 238.

The measurement beam S2 is set at a light emitting intensity that is sufficient to reliably detect the reflected beam reflected from the measured object present in a detection range set in the measurement target space. This may cause saturation of the amplification circuit 5b depending on the intensity in the reflected light, which fails to obtain linear output characteristics. Specifically, since the reflected beam, even if it is on a slight level, may be amplified to a substantial level, the dynamic range of the amplification circuit 5b is beyond the span of intensity of reflected beam, thereby saturating the amplification circuit 5b when it responds to a reflected beam in high intensity.

Figure 3A:
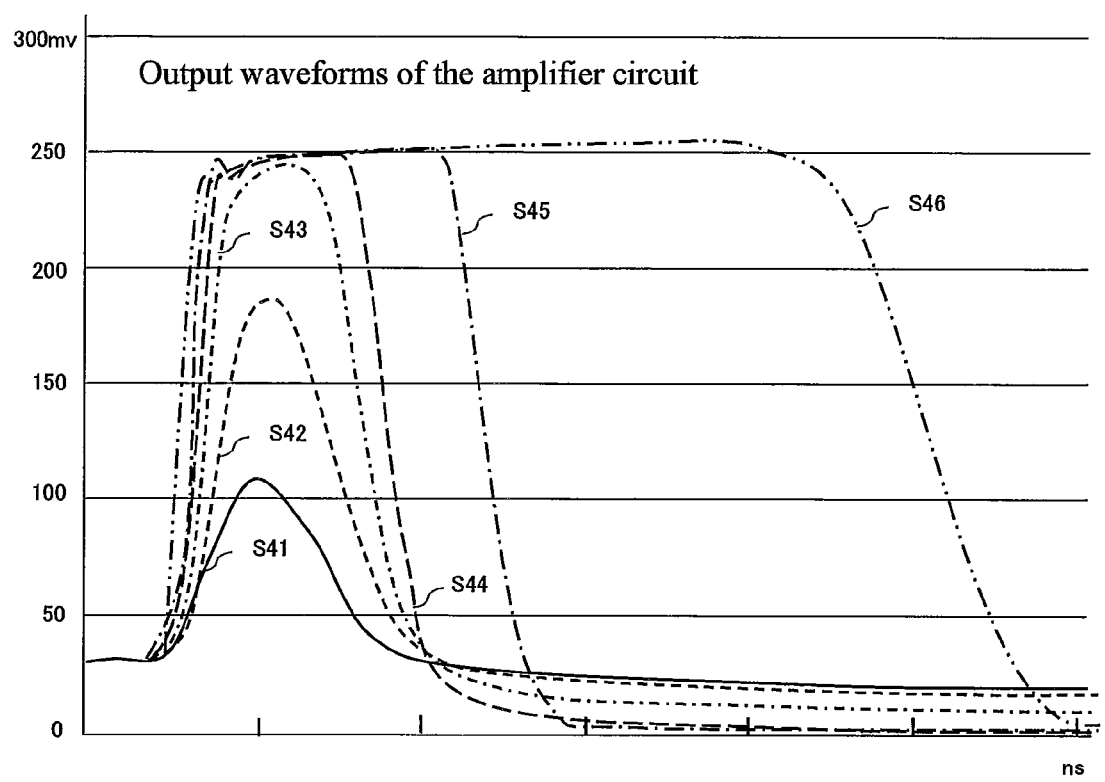
FIG. 3A is an explanatory diagram illustrating signal waveforms of reflection signals of various levels amplified at an amplifier circuit.

Referring to FIG. 3A, which shows output waveforms of the amplification circuit 5b, when the quantity of reflected lights reflected from the measured object are small, the output waveforms are linearly amplified, as represented by reflection signals S41 to S43. When the quantity of reflected lights reflected from the measured object are large, the amplification circuit 5b is saturated and may not output correct waveheight values, which stagnates the period of time before the output of the amplification circuit 5b falls. In this case, the calculated barycentric position deviates from a true barycentric position, and a distance L to the measured object may not be correctly calculated.

However, when the output of the amplification circuit 5b is saturated as represented by the reflection signals S44 to S46, a correlation is known to exist between an integral value of the reflection signal and the receiving light quantity of the reflected beam S3. Accordingly, the distance D calculated based on the barycentric position detected by the distance arithmetic unit 235 may be appropriately corrected in accordance with the integral value and a predetermined correction table value.

Figure 3B:
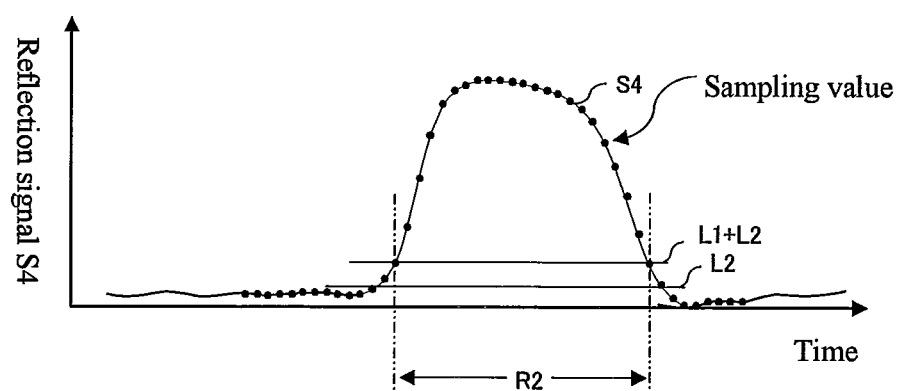
FIG. 3B an explanatory diagram illustrating signal processing with respect to a standard reflection signal.

As shown in FIG. 3B, the correction processing unit 236 integrates the reflection signal S4 through the low-pass filter 231 as an integral range R2 that is between a sampling value obtained immediately before a point that initially exceeds a sum of the first measurement threshold value L1 and the second measurement threshold value L2, both of which is obtained by the waveform determining unit 233, and a sampling value that initially falls below the second measurement threshold value L2.

In this respect, the correction processing unit 236 subtracts the integral value of an area that is equal to or less than the second measurement threshold value L2 from the integral value corresponding to the integral range R2, thereby eliminating an offset error. It is noted that the elimination of offset error may also be carried out by integrating values obtained by subtracting the second measurement threshold value L2 from the sampling values within the integral range R2.

Upon receipt of, from the waveform determining unit 233, information indicating that the output waveform output from the amplification circuit 5b is saturated, the correction processing unit 236 calculates a correction distance Dc corresponding to the calculated integral value based on the correction table value showing integral values in relation to correction distances stored in advance in the correction data memory 237, corrects the distance D that has been previously calculated, and stores the correction value and the counter value in the output memory 238.

It is noted that when the peak value of the reflection signal S4 exceeds a threshold value that is set at a few percent lower than a predetermined maximum output of the amplification circuit 5b, then the waveform determining unit 233 determines that the output waveform of the amplification circuit 5b is saturated.

The basic arithmetic processing performed by the signal processor 23 has been described hereinbefore.

However, as shown in FIG. 1, a semi-transparent reflection object T' such as a piece of glass, which may be a source of noise, may exist between the scanning rangefinder 1 and a measured object T that is truly targeted for detection, namely, a target measured object T. Especially when the reflection object T' is close to the measured object T, a reflected beam reflected from the reflection object T' may overlap the reflected beam reflected from the measured object T. This may disable the calculation of a correct distance to the target measured object T, which is truly targeted for detection.

Figure 4A:
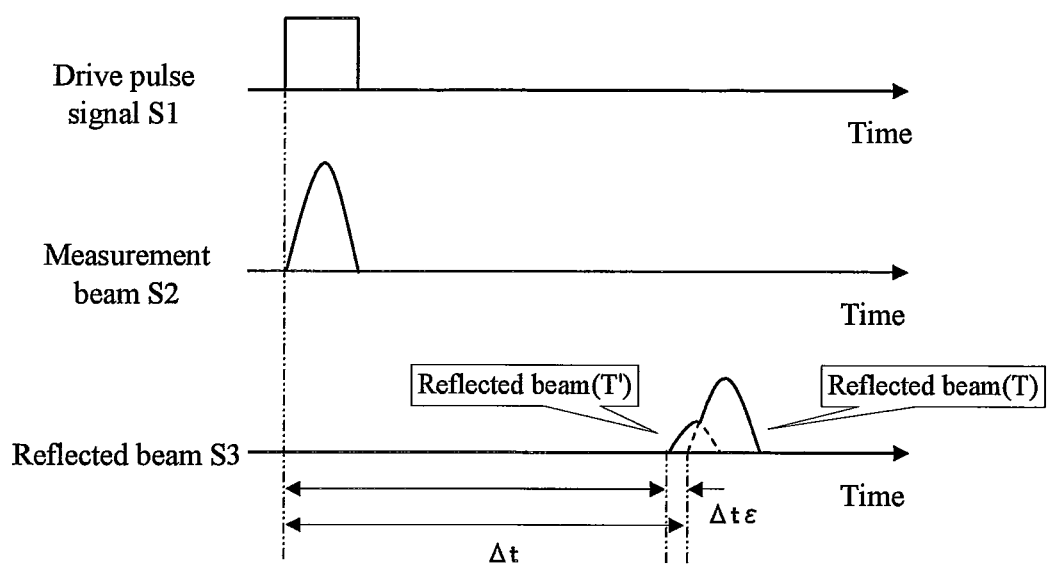
FIG. 4A is an explanatory diagram illustrating a principle of distance measurement that is based on a reflected beam including a plurality of reflected beams reflected from a plurality of overlapping measured objects.

FIG. 4A shows a reflected beam S3 that is an overlapping beam of the reflected beams reflected from the reflection object T' and from the measured object T. With such reflected beam S3, the calculated distance is based on a time difference that is shorter by $\Delta t_e$ than the expected time difference $\Delta t$ between the output time of the measurement beam and the detection time of the reflected beam reflected from the target measured object T. This disables the calculation of the correct distance.

This phenomenon is not limited to the semi-transparent reflection object T' such as a piece of glass, but may also occur when an object, such as a branch of a tree, that is smaller than the beam of light of the measurement beam exists between the scanning rangefinder 1 and the target measured object T, or when the optical window 2a is unclear and contaminated.

Figure 4B:
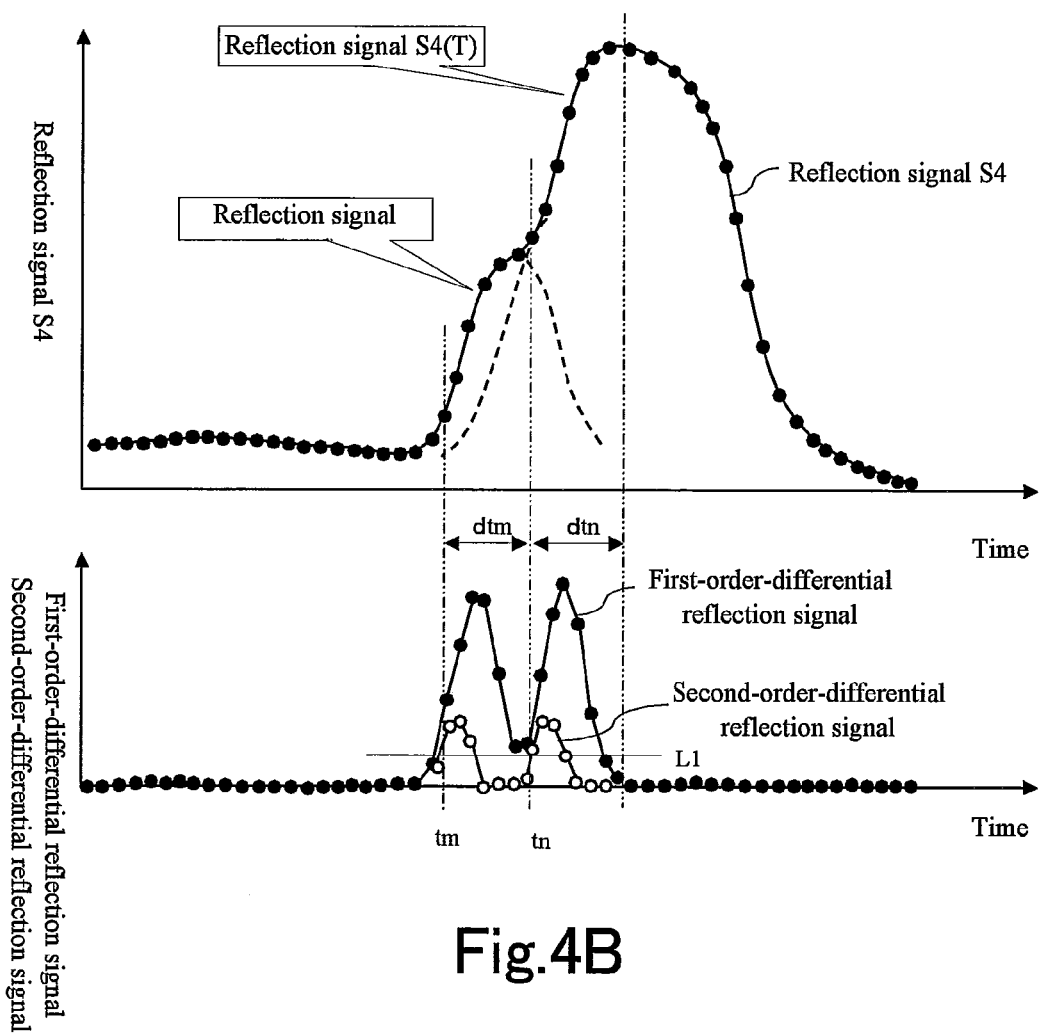
FIG. 4B is an explanatory diagram illustrating a first order differential reflection signal and a second order differential reflection signal.

FIG. 4B shows a reflection signal S4 that corresponds to the reflected beam S3, and a first-order-differential reflection signal and a second-order-differential reflection signal that are based on the reflection signal S4.

In the case of the usual, single reflection signal S4 shown in FIG. 3B, the first-order-differential reflection signal exceeds the first measurement threshold value L1 at the rise time of the reflection signal S4 and monotonically increases to an inflection point of the reflection signal S4. Subsequently, the first-order-differential reflection signal monotonically decreases below the first measurement threshold value L1 at the time when the reflection signal S4 reaches its peak, ending up in zero. Thus monitoring the first-order-differential reflection signal enables the single reflection signal S4 to be discriminated.

However, as shown in FIG. 4B, for example, if two reflection signals S4(T) and S4(T') overlap, the resulting first-order-differential reflection signal forms a two-mountain shape that falls, but not below the first measurement threshold value L1 at the valley between the peaks but rises again instead. In this case, depending on the way the two reflection signals overlap, monitoring the first-order-differential reflection signal may not clearly indicate whether the reflection signal is in overlapping state.

Even in this case, the second-order-differential reflection signal falls below the first measurement threshold value L1 and reaches zero at the peaks of the two-mountain shape of the first-order-differential reflection signal. This ensures that the overlapping waveforms may be separated based on the second-order-differential reflection signal. Even if the number of the overlapping reflection signals is more than two, the reflection signals may be separated into respective waveforms.

Accordingly, the waveform determining unit 233 is configured to determine whether the reflected beam includes a plurality of overlapping reflected beams reflected from a plurality of measured objects based on a rising characteristic and a falling characteristic of the first-order-differential reflection signal obtained by first order differential of the reflection signal by the differential processing unit 232 and based on a rising characteristic of a second-order-differential reflection signal obtained by second order differential of the reflection signal by the differential processing unit 232.

Specifically, the waveform determining unit 233 determines that the reflected beam includes a plurality of overlapping reflected beams reflected from a plurality of measured objects when the waveform determining unit 233 detects a second rise time or the subsequent rise time on the second-order-differential reflection signal to a predetermined threshold value (which is set adequately to eliminate noise and is, in the present embodiment, set at the first measurement threshold value L1) or beyond, by the time the first-order-differential reflection signal falls to a predetermined threshold value (which is set adequately to eliminate noise and is, in the present embodiment, likewise, set at the first measurement threshold value L1) or below.

It is noted that even though the reflected beam is actually in overlapping state, the waveform determining unit 233 determines that the reflected beam is not in overlapping state when the waveform determining unit 233 does not detect a second rising of the second-order-differential reflection signal to or beyond the predetermined threshold value by the time the first-order-differential reflection signal falls to or below the predetermined threshold value.

Examples include overlapping of a reflected beam in a high intensity and a reflected beam in a lower intensity than the high intensity at the time corresponding to a peak value of the reflected beam in high intensity or after that. In this case, the time when the first-order-differential reflection signal exceeds the first measurement threshold value L1 may be used as a basis for determining and processing the reflection signal corresponding to the reflected beam in light intensity.

The signal separating unit 234 separates the first-order-differential reflection signal input from the differential processing unit 232 based on a determination of the waveform determining unit 233 and outputs the first-order-differential reflection signal to the distance arithmetic unit 235. Subsequently, the distance arithmetic unit 235 performs barycentric position arithmetic operations for each first-order-differential reflection signal separated by the signal separating unit 234 and performs corresponding distance arithmetic operations.

Specifically, at the time when the first-order-differential reflection signal input from the differential processing unit 232 rises from below the first measurement threshold value L1 and exceeds the first measurement threshold value L1 (the time tm in FIG. 4B), the waveform determining unit 233 determines the time as the reference position of a section over which to detect the rising of the reflection signal. The waveform determining unit 233 then outputs a first determination signal to the signal separating unit 234. The waveform determining unit 233 outputs the first determination signal until the time when the first-order-differential reflection signal falls below the first measurement threshold value L1.

During the output of the first determination signal and at the second time when the second-order-differential reflection signal input from the differential processing unit 232 exceeds the first measurement threshold value L1 (the time to in FIG. 4B), the waveform determining unit 233 outputs a second determination signal to the signal separating unit 234. Repeating this processing ensures that a reflection signal including a plurality of overlapping reflection signals be separated into respective waveforms.

In the example of FIG. 4B, in response to each of the determination signals, the signal separating unit 234 separates the reflection signal and the first-order-differential reflection signal and outputs to the distance arithmetic unit 235. Specifically, the signal separating unit 234 outputs to the distance arithmetic unit 235 the first-order-differential reflection signal in the section dtm in FIG. 4B as a barycentric position arithmetic signal for the first reflection signal S4(T'), while outputting the first-order-differential reflection signal in the section dtn as a barycentric position arithmetic signal for the next reflection signal S4(T).

The distance arithmetic unit 235 performs barycentric position arithmetic operations for the first-order-differential reflection signal in the section dtm to calculate a corresponding distance, while performing barycentric position arithmetic operations for the first-order-differential reflection signal in the section dtn to calculate a corresponding distance. The correction processing unit 236 performs the above-described correction for the calculated distances as necessary, and the output memory 238 stores the distances after the correction.

Specifically, with reference to the second rise time of the second-order-differential reflection signal, the distance arithmetic unit 235 calculates the barycentric position of the first-order-differential reflection signal for the reflection signal S4(T) separated by the signal separating unit 234, obtains the time corresponding to the barycentric position as the detection time of the reflected beam, and calculates the distance to the measured object T based on a time difference between the output time of the measurement beam and the detection time of the reflected beam.

In other words, the calculated distance is based on, as the rise time, the barycentric position obtained by means of the barycentric position arithmetic operations performed for the first-order-differential reflection signal in the section dtn. However, in fact, the section dtn does not encompass the part of the first-order-differential reflection signal corresponding to the rise time of the original reflection signal S4(T). This may cause output errors that potentially indicate a longer distance than the actual distance.

In view of this, the correction data memory 237 is configured to correct the distance, which has been obtained by means of the arithmetic processing, to the measured object T.

The correction data memory 237 stores correction data C to correct the distance calculated with reference to the second rise time of the second-order-differential reflection signal, with regard to a reference reflected beam that includes a plurality of overlapping reflected beams reflected from a plurality of measured objects whose relative position is predetermined, based on a relation among a distance Dm that is calculated with reference to the rise time of the first-order-differential reflection signal, a distance Dn that is calculated with reference to the second rise time of a second-order-differential reflection signal of the reference reflected beam, and peak values Vpm and Vpn of reflection signals targeted for calculation of each of the distances Dm and Dn. Specifically, the correction data memory 237 stores a correction data table including a distance difference "Dn−Dm" and the peak values Vpm and Vpn as variables.

The correction processing unit 236 reads the correction data corresponding to the variables "Dn−Dm" and Vpm and Vpn from the correction data table and carries out arithmetic processing "Dn−C" to obtain a distance D (D=Dn−C) to the target measured object.

It is possible to calculate the correction data C with reference to a correlation formula 4 described below which is obtained using the actual distance and distances calculated by the above-described arithmetic processing using sampling data obtained by tests in advance.

$$C=F(Dm,Dn,Vpm,Vpn) \quad (4)$$

In this case, the correction processing unit 236 substitutes the function F's variables Dm, Dn, Vpm, and Vpn to calculate a correction value C, and carries out arithmetic processing "Dn−C" to obtain the distance D (D=Dn−C) to the target measured object.

It is noted that when the waveform determining unit 233 determines that the reflected beam S3 includes a plurality of overlapping reflected beams reflected from a plurality of measured objects T and T', the distance arithmetic unit 235 may determine that the distance to the target measured object T is a distance calculated based on a reflection signal S4(T) that shows the maximum peak value among the reflection signals S4 separated by the signal separating unit 234, and may output such a distance as the distance to the target measured object T.

This configuration ensures accurate calculation and output of only the distance to the target measured object, even when a semi-transparent reflection object T' such as a piece of glass exists near the target measured object, even when an object, such as a branch of a tree, that is smaller than the beam of light of the measurement beam exists, or even when the optical window 2a is unclear and contaminated.

When the waveform determining unit 233 determines that the reflected beam S3 includes a plurality of overlapping reflected beams reflected from a plurality of measured objects, and when a difference between a distance to the optical window 2a and a distance corresponding to a reflected beam, among the plurality of reflected beams of the reflected beam S3, that is initially calculated by the distance arithmetic unit 235 falls within a predetermined range, then the distance arithmetic unit 235 may store, in the output memory 238, signal data indicating that the optical window 2a is unclear and contaminated. This enables a notification to be made externally through the system controller 24 that the optical window 2a is unclear and contaminated. Further, the scanning rangefinder 1 may include a display unit to display a notification through the system controller 24 that the optical window 2a is unclear and contaminated.

When a scanning rangefinder is used outdoors, it is possible that the scanning rangefinder may be adversely affected according to the weather, such as a fog, rain, and snow, so that a reflected beam reflected from the fog, raindrops, or snow-flakes may be erroneously detected as the reflected beam reflected from the measured object. In view of this, the scanning rangefinder 1 accommodates to such a situation.

Figure 7A:
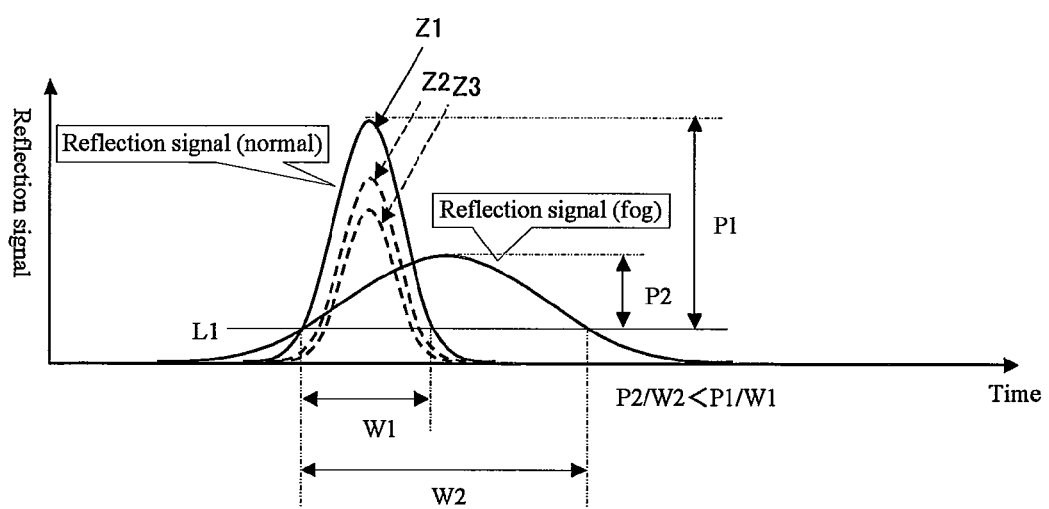
FIG. 7A is an explanatory diagram illustrating a difference between a usual reflected beam and a reflected beam reflected from a fog, as detected by the scanning rangefinder.

As shown in FIG. 7A, a pulse reflection signal detected by the light receiving unit 5 varies in value such as the peak value P and pulse width W, depending on the surface reflectivity of the measured object, the distance to the measured object, and other parameters. However, the ratio P1/W1 of peak value P1 to pulse width W1 that results in signals having nearly constant similarity shape (see the solid waveform Z1 indicated "normal" and the dashed waveforms Z2 and Z3 in FIG. 7A).

Contrarily, a reflected beam reflected from a fog is a combination of reflected beams reflected from individual fine particles of the fog. Such a reflected beam tends to have a relatively low peak value P2 and a relatively large pulse width W2. Thus a comparison of the ratio P2/W2 of the peak value P2 to the pulse width W2 with the ratio P1/W1 always results in "P2/W2<P1/W1".

In view of this, when the ratio P/W of the peak value P to the pulse width W of the reflected beam is lower than a predetermined threshold value Pb/Wb (≈P1/W1), the waveform determining unit 233 determines that the reflected beam is not appropriate. When the waveform determining unit 233 determines that the reflected beam is not appropriate, the distance arithmetic unit 235 stops the calculation of the distance or stop the output of the calculated distance to the output memory 238.

When the measured object exists in a fog and the light receiving unit 5 detects overlapping reflected beams including the reflected beam reflected from the fog and the reflected beam reflected from the measured object T, then the waveform determining unit 233 may calculate a first reflection signal, that is, the ratio P/W of the peak value P to the pulse width W for the part of the reflection signal in the section dtm in FIG. 4B based on the first-order-differential reflection signal and the second-order-differential reflection signal input from the differential processing unit 232. When the ratio P/W is smaller than predetermined threshold value Pb/Wb, the waveform determining unit 233 may determine that the first reflection signal is the reflected beam reflected from the fog.

In this case, the distance arithmetic unit 235 may, upon receipt of the determination of the waveform determining unit 233, determine that the distance to the target measured object T is a distance calculated based on the reflection signal S4(T) showing the maximum peak value among the reflection signals S4 separated by the signal separating unit 234, and output such a distance as the distance to the target measured object T, in a similar manner to the above-described manner.

Figure 7B:
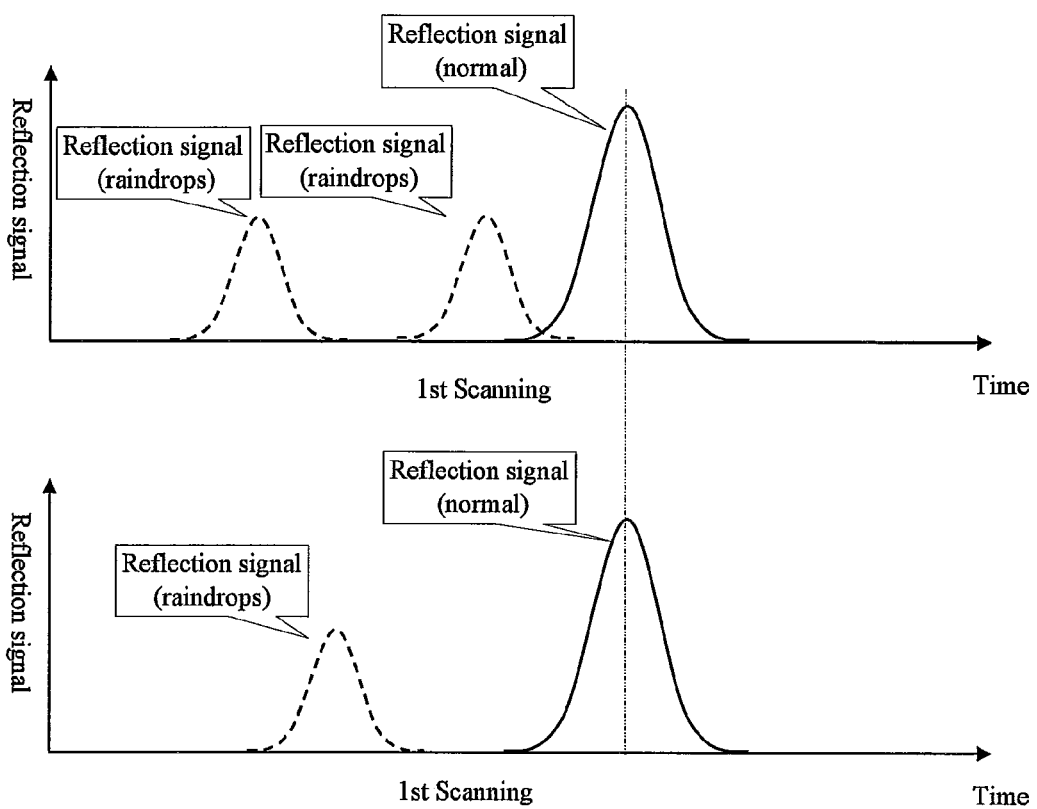
FIG. 7B is an explanatory diagram illustrating a difference between a usual reflected beam and a reflected beam reflected from raindrops or similar objects, as detected by the scanning rangefinder.

As shown in FIG. 7B, a reflected beam reflected from raindrops or snowflakes indicates a value that is equal to or more than the predetermined threshold value Pb/Wb, similarly to a usual reflected beam. However, since raindrops and snowflakes do not stay at the same position for a long time in the measurement target space, the distance arithmetic unit 235 calculates different distances based on reflected beams reflected from the raindrops or snowflakes, every time the scanning unit carries out scanning. Contrarily, the distance to a measured object that spends a sufficiently long time on moving for a scanning period is an approximately constant value in a plurality of scanning frequencies.

In view of this, only when the distance calculated for a measurement beam scanned in a deflected manner by the scanning unit in one same direction falls within a predetermined allowable range in a plurality of scanning frequencies, the distance arithmetic unit 235 determines the distance as the distance to the target measured object, instead of the distance to the raindrops or snowflakes, and outputs the distance to the output memory 238.

For example, assume that the scanning range of the measurement beam of the scanning rangefinder 1 is segmented into a plurality of ranges in accordance with a predetermined distance and a scanning angle pitch. When a measured object is detected consecutively in a target range in a plurality of scanning periods, the distance arithmetic unit 235 may determine the measured object included in the target range as the target measured object, and stored the corresponding angle and distance in the output memory 238. A range provided by the predetermined distance and the scanning angle pitch is within the predetermined allowable range.

Figure 7C:
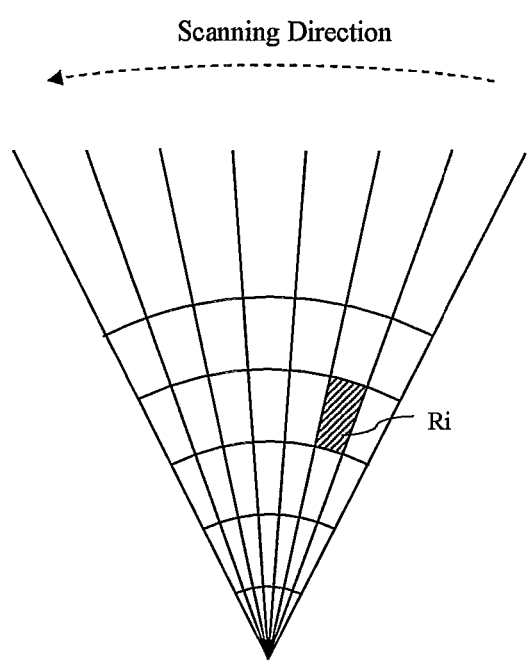
FIG. 7C is an explanatory diagram illustrating a case in which a distance calculated by the scanning rangefinder scanning in one same direction is determined to be a distance to a target measured object and is output as such only when the calculated distance falls within a predetermined allowable range.

FIG. 7C shows an example in which the scanning range is divided into a plurality of ranges in accordance with a predetermined distance and a scanning angle pitch. The output memory 238 includes counter ranges defined to correspond to the divided ranges. When the scanning of a measurement beam detects a measured object, one is added to the counter of a range corresponding to an angle and a distance calculated by the distance arithmetic unit 235, while when no measured object is detected, the counter of a corresponding range is reset.

When the counter value is equal to or more than a predetermined value N (N is an integer), the target measured object is determined to exist in the range corresponding to the counter value. In the example of FIG. 7C, the predetermined value N is set at 2 (N=2), which means that when the counter value of the hatched range Ri is two, the target measured object is determined to exist in the range Ri.

The range division and predetermined value N are variable according to the measurement environment. For example, in the case of a light rain, the detection probability is low, thus the predetermined value N is set at 2 (N=2). In the case of a heavy rain, the detection probability is high, thus the predetermined value N is set at 3 to 4 (N=3 to 4). Setting the predetermined value N in this manner ensures appropriate elimination of the susceptibility to raindrops. The period to carry out the determination, in other words, the predetermined value N, is determined based on the relation of the scanning period of the scanning unit and the falling speed of the raindrops and snowflakes.

Hereinafter, embodiments of the present invention will be described.

The above-described embodiment is an example in which the arithmetic unit including the distance arithmetic unit 235 and the correction processing unit 236 calculates the distance to the measured object based on a time difference between an output time of the measurement beam and a detection time of the reflected beam and outputs the distance to the output memory 238. Alternatively, the distance arithmetic unit 235 may calculate a time difference between the output time of the measurement beam and the detection time of the reflected beam; the correction processing unit 236 may correct the time difference and output a corrected time difference to the output memory 238; and the system controller 24 may read the corrected time difference from the output memory 238 and calculate the distance. In other words, the arithmetic unit of the embodiments of the present invention is concepted to include not only the distance arithmetic unit 235 and the correction processing unit 236 but also the system controller 24.

The A/D converter 22 and the signal processor 23 may operate on a common clock signal. Alternatively, when high speed processing is required, the A/D converter 22 and the signal processor 23 may operate on different clock signals, considering an increase in cost of components of the signal processor 23.

For example, when the A/D converter 22 operates on a clock signal having a frequency of 1 GHz while the signal processor 23 operates on a clock signal having a frequency of 100 MHz, then the A/D converter 22 generates data of at least 10 times data that the signal processor 23 is able to process. In this case, to execute real-time arithmetic processing, the arithmetic processing unit of the signal processor 23, which includes the differential processing unit 232, the waveform determining unit 233, the signal separating unit 234, and the distance arithmetic unit 235, may preferably be configured in a pipeline structure in which a plurality of data are processed in parallel.

Since the scanning rangefinder 1 includes the prism 16 to detect the correction reference distance at the reference position and the correction processing unit 236 to correct the calculated distance using the reference distance, the measurement scan angle range is limited.

Figure 8:
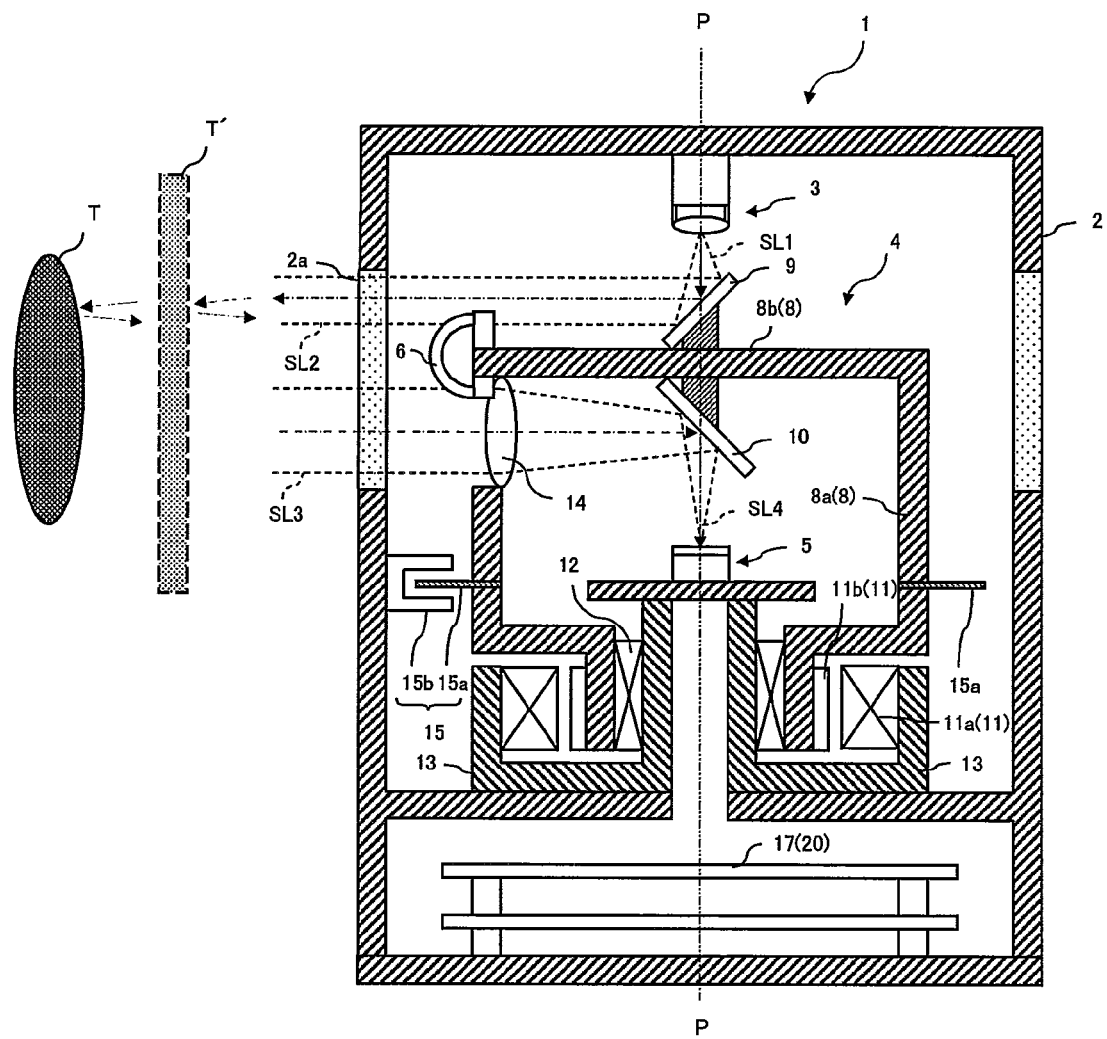
FIG. 8 is a schematic vertical cross-sectional view of a scanning rangefinder according to another embodiment of the present invention illustrating a general arrangement of the scanning rangefinder.

In view of this, the scanning rangefinder 1 may be as shown in FIG. 8. The scanning rangefinder 1 includes, instead of the prism 16, a light guide member 6 to continually guide part of the measurement beam irradiated in the measurement target space into the light receiving unit 5.

The light receiving unit 5 detects, among the measurement beam rotatably scanned by the scanning unit, a reference beam through the light guide member 6 and also detects, later than the reference beam, a reflected beam reflected from the measured object. The reference beam and the reflected beam are analog-to-digital converted at the A/D converter 22 and processed at the signal processor 23.

In the signal processor 23, the differential processing unit 232 differentiates both a reference signal corresponding to the reference beam and a reflection signal corresponding to the reflected beam. The distance arithmetic unit 235 obtains barycentric positions for both signals, and, further, calculates a difference between the barycentric positions for both signals as the time difference between the output time of the measurement beam and the detection time of the reflected beam. This eliminates the need for the correction processing using the reference distance. Since there is no need for the prism 16, the measurement scan angle range covers 360 degrees.

The above-described embodiment is an example in which the signal processor 23 includes an integrated circuit such as ASIC including a gate array and a digital signal processor. Alternatively, a part or all of the processing blocks of the signal processor 23 may include a computer such as a microcomputer that includes a memory to store control programs that realize the functions of the processing blocks, and a central processing unit (CPU) to execute the control programs stored in the memory.

In the above-described embodiments, the distance arithmetic unit 235 specifies the rise time of the reflected beam based on the barycentric position of the first-order-differential reflection signal. Alternatively, the arithmetic unit of an embodiment of the present invention may simply calculate and output the distance to the measured object based on the reflection signal according to the determination by the waveform determining unit 233. Therefore, the way the arithmetic unit identifies the rise time of the reflected beam is not limited to the arithmetic operation for the barycentric position of the first-order-differential reflection signal.

For example, the distance arithmetic operation may be performed assuming that the time at which the second-order-differential reflection signal exceeds a predetermined threshold value is the rise time of the reflected beam. Alternatively, the distance arithmetic operation may be performed assuming that the time at which the reflection signal or the first-order-differential reflection signal exceeds a predetermined threshold value is the rise time of the reflected beam, with the predetermined threshold value set to be variable depending on the determination of the waveform determining unit 233. For example, the predetermined threshold value for a second reflection signal is set to be larger than the predetermined threshold value for a first reflection signal, whereby the rise time of each of the reflection signals may be obtained.

The above-described embodiments are an example in which the signal processing apparatus is built in the scanning rangefinder. The signal processing apparatus of the embodiments of the present invention is not limited to the built in signal processing apparatus, but may be disposed in the exterior of the scanning rangefinder.

Moreover, the signal processing target of the signal processing apparatus is not limited to the scanning rangefinder, but may be applied to a reflection signal output from a rangefinder that does not include a scanning mechanism.

It is stressed that the present invention is not restricted to the exemplifying embodiments described above. Various changes and modifications with respect to the concrete structures of the scanning rangefinder and concrete circuit structures or concrete software structures of the signal processor 23 may be applied within the scope of operation and effect of the present invention.

What is claimed is:

1. A signal processing apparatus configured to process a signal output from a rangefinder, the rangefinder comprising:
    a light emitting unit configured to output a pulse measurement beam to a measurement target space through an optical window; and
    a light receiving unit configured to detect a reflected beam reflected from a target measured object present in the measurement target space and to output a reflection signal corresponding to the reflected beam;
    the signal processing apparatus comprising:
    a differential processing unit configured to differentiate the reflection signal output from the light receiving unit;
    a waveform determining unit configured to determine whether the reflected beam includes a plurality of overlapping reflected beams reflected from a plurality of measured objects including the target measured object based on a rising characteristic and a falling characteristic of a first-order-differential reflection signal obtained by first order differential of the reflection signal by the differential processing unit and based on a rising characteristic of a second-order-differential reflection signal obtained by second order differential of the reflection signal by the differential processing unit; and
    an arithmetic unit configured to, in response to a determination of the waveform determining unit, calculate and output a distance to the target measured object based on the reflection signal.

2. The signal processing apparatus according to claim 1, wherein when the waveform determining unit detects a second rise time or the subsequent rise time on the second-order-differential reflection signal that is raised to or beyond a predetermined threshold value by a time the first-order-differential reflection signal falls to or below a predetermined threshold value, the waveform determining unit is configured to determine that the reflected beam includes the plurality of overlapping reflected beams reflected from the plurality of measured objects including the target measured object.

3. The signal processing apparatus according to claim 1, wherein the arithmetic unit is configured to calculate a barycentric position of the first-order-differential reflection signal obtained by first order differential by the differential processing unit, to obtain a time corresponding to the barycentric position as a detection time of the reflected beam, and to calculate a distance to the target measured object based on a time difference between an output time of the measurement beam and the detection time of the reflected beam.

4. The signal processing apparatus according to claim 1, wherein when the waveform determining unit determines that the reflected beam includes the plurality of overlapping reflected beams reflected from the plurality of measured objects, the arithmetic unit is configured to output a signal indicating that the optical window is unclear and contaminated.

5. The signal processing apparatus according to claim 1,
    wherein the waveform determining unit is configured to determine that when a ratio P/W of a peak value P to a pulse width W with respect to the reflected beam is lower than a predetermined threshold value Pb/Wb, the reflected beam is not appropriate, and
    wherein when the waveform determining unit determines that the reflected beam is not appropriate, the arithmetic unit is configured to stop calculation of the distance or stop output of the calculated distance.

6. A signal processing apparatus configured to process a signal output from a rangefinder, the rangefinder comprising:
    a light emitting unit configured to output a pulse measurement beam to a measurement target space through an optical window; and
    a light receiving unit configured to detect a reflected beam reflected from a target measured object present in the measurement target space and to output a reflection signal corresponding to the reflected beam;
    the signal processing apparatus comprising:
    a differential processing unit configured to differentiate the reflection signal output from the light receiving unit;
    a waveform determining unit configured to determine whether the reflected beam includes a plurality of overlapping reflected beams reflected from a plurality of measured objects including the target measured object based on a rising characteristic and a falling characteristic of a first-order-differential reflection signal obtained by first order differential of the reflection signal by the differential processing unit and based on a rising characteristic of a second-order-differential reflection signal obtained by second order differential of the reflection signal by the differential processing unit;
    a signal separating unit configured to separate the reflection signal with reference to a second rise time or the subsequent rise time on the second-order-differential reflection signal when the waveform determining unit determines that the reflected beam includes the plurality of overlapping reflected beams reflected from the plurality of measured objects; and
    an arithmetic unit configured to calculate a barycentric position of the first-order-differential reflection signal for the reflection signal separated by the signal separating unit with reference to the second rise time or the subsequent rise time on the second-order-differential reflection signal, to obtain a time corresponding to the barycentric position as a detection time of the reflected beam, and to calculate and output a distance to the target measured object based on a time difference between an output time of the measurement beam and the detection time of the reflected beam.

7. The signal processing apparatus according to claim 6, further comprising a memory storing correction data to correct a distance calculated with reference to the second rise time or the subsequent rise time on the second-order-differential reflection signal, with regard to a reference reflected beam including a plurality of overlapping reflected beams reflected from a plurality of measured objects whose relative position is predetermined, based on a relation among a distance calculated with reference to a rise time of a first-order-differential reflection signal, a distance calculated with reference to a second rise time or the subsequent rise time on a second-order-differential reflection signal of the reference reflected beam, and peak values of reflection signals targeted for calculation of each of the distances related to the reference reflected beam, and wherein the arithmetic unit is configured to correct the distance calculated with reference to the second rise time or the subsequent rise time on the second-order-differential reflection signal based on the correction data stored in the memory.

8. The signal processing apparatus according to claim 6, wherein when the waveform determining unit determines that the reflected beam includes the plurality of overlapping reflected beams reflected from the plurality of measured objects, the arithmetic unit is configured to output a distance calculated based on a reflection signal showing a maximum peak value among reflection signals separated by the signal separating unit as the distance to the target measured object.

9. The signal processing apparatus according to claim 6, wherein when the waveform determining unit determines that the reflected beam includes the plurality of overlapping reflected beams reflected from the plurality of measured objects, the arithmetic unit is configured to output a signal indicating that the optical window is unclear and contaminated.

10. The signal processing apparatus according to claim 6,
    wherein the waveform determining unit is configured to determine that when a ratio P/W of a peak value P to a pulse width W with respect to the reflected beam is lower than a predetermined threshold value Pb/Wb, the reflected beam is not appropriate, and
    wherein when the waveform determining unit determines that the reflected beam is not appropriate, the arithmetic unit is configured to stop calculation of the distance or stop output of the calculated distance.

11. A signal processing apparatus configured to process a signal output from a rangefinder, the rangefinder comprising:
    a light emitting unit configured to output a pulse measurement beam to a measurement target space through an optical window; and
    a light receiving unit configured to detect a reflected beam reflected from a target measured object present in the measurement target space and to output a reflection signal corresponding to the reflected beam;
    the signal processing apparatus comprising:
    a differential processing unit configured to differentiate the reflection signal output from the light receiving unit;
    a waveform determining unit configured to determine whether the reflected beam includes a plurality of overlapping reflected beams reflected from a plurality of measured objects including the target measured object based on a rising characteristic and a falling characteristic of a first-order-differential reflection signal obtained by first order differential e of the reflection signal by the differential processing unit and based on a rising characteristic of a second-order-differential reflection signal obtained by second order differential of the reflection signal by the differential processing unit; and an arithmetic unit configured to, in response to a determination of the waveform determining unit, calculate a distance to the target measured object based on the reflection signal, and to output the distance only when the distance calculated for the measurement beam scanned in a deflected manner by a scanning unit in one same direction falls within a predetermined allowable range in a plurality of periods.

12. The signal processing apparatus according to claim 11, wherein when the waveform determining unit detects a second rise time or the subsequent rise time on the second-order-differential reflection signal that is raised to or beyond a predetermined threshold value by a time the first-order-differential reflection signal falls to or below a predetermined threshold value, the waveform determining unit is configured to determine that the reflected beam includes the plurality of overlapping reflected beams reflected from the plurality of measured objects including the target measured object.

13. The signal processing apparatus according to claim 11, wherein the arithmetic unit is configured to calculate a barycentric position of the first-order-differential reflection signal obtained by first order differential by the differential processing unit, to obtain a time corresponding to the barycentric position as a detection time of the reflected beam, and to calculate a distance to the target measured object based on a time difference between an output time of the measurement beam and the detection time of the reflected beam.

14. The signal processing apparatus according to claim 11, wherein when the waveform determining unit determines that the reflected beam includes the plurality of overlapping reflected beams reflected from the plurality of measured objects, the arithmetic unit is configured to output a signal indicating that the optical window is unclear and contaminated.

15. The signal processing apparatus according to claim 11, wherein the waveform determining unit is configured to determine that when a ratio P/W of a peak value P to a pulse width W with respect to the reflected beam is lower than a predetermined threshold value Pb/Wb, the reflected beam is not appropriate, and
    wherein when the waveform determining unit determines that the reflected beam is not appropriate, the arithmetic unit is configured to stop calculation of the distance or stop output of the calculated distance.

16. The signal processing apparatus according to claim 11, further comprising a signal separating unit configured to separate the reflection signal with reference to a second rise time or the subsequent rise time on the second-order-differential reflection signal when the waveform determining unit determines that the reflected beam includes the plurality of overlapping reflected beams reflected from the plurality of measured objects,
    wherein the arithmetic unit is configured to calculate a barycentric position of the first-order-differential reflection signal for the reflection signal separated by the signal separating unit with reference to the second rise time or the subsequent rise time on the second-order-differential reflection signal, to obtain a time corresponding to the barycentric position as the detection time of the reflected beam, and to calculate the distance to the target measured object based on a time difference between an output time of the measurement beam and a detection time of the reflected beam.

17. The signal processing apparatus according to claim 11, wherein further comprising a memory storing correction data to correct a distance calculated with reference to the second rise time or the subsequent rise time on the second-orderdifferential reflection signal, with regard to a reference reflected beam including a plurality of overlapping reflected beams reflected from a plurality of measured objects whose relative position is predetermined, based on a relation among a distance calculated with reference to a rise time of a first-order-differential reflection signal, a distance calculated with reference to a second rise time or the subsequent rise time on a second-order-differential reflection signal of the reference reflected beam, and peak values of reflection signals targeted for calculation of each of the distances related to the reference reflected beam, and wherein the arithmetic unit is configured to correct the distance calculated with reference to the second rise time or the subsequent rise time on the second-order-differential reflection signal based on the correction data stored in the memory.

18. The signal processing apparatus according to claim 11, wherein when the waveform determining unit determines that the reflected beam includes the plurality of overlapping reflected beams reflected from the plurality of measured objects, the arithmetic unit is configured to output a distance calculated based on a reflection signal showing a maximum peak value among reflection signals separated by the signal separating unit as the distance to the target measured object.

19. The signal processing apparatus according to claim 11, wherein when the waveform determining unit determines that the reflected beam includes the plurality of overlapping reflected beams reflected from the plurality of measured objects, the arithmetic unit is configured to output a signal indicating that the optical window is unclear and contaminated.

20. The signal processing apparatus according to claim 11, wherein the waveform determining unit is configured to determine that when the ratio P/W of the peak value P to the pulse width W with respect to the reflected beam is lower than the predetermined threshold value Pb/Wb, the reflected beam is not appropriate, and wherein when the waveform determining unit determines that the reflected beam is not appropriate, the arithmetic unit is configured to stop calculation of the distance or stop output of the calculated distance.

21. A scanning rangefinder comprising:
a light emitting unit configured to output a pulse measurement beam;
a scanning unit to periodically scan the measurement beam output from the light emitting unit in a deflected manner to a measurement target space through an optical window;
a light receiving unit configured to detect a reflected beam including a plurality of overlapping reflected beams reflected from a plurality of measured objects including a target measured object present in the measurement target space, and to output a reflection signal corresponding to the reflected beam; and
the signal processing apparatus configured to process the reflection signal output from the light receiving unit and to calculate and output a distance to the target measured object, the signal processing apparatus including:
a differential processing unit configured to differentiate the reflection signal output from the light receiving unit;
a waveform determining unit configured to determine whether the reflected beam includes a plurality of overlapping reflected beams reflected from a plurality of measured objects including the target measured object based on a rising characteristic and a falling characteristic of a first-order-differential reflection signal obtained by first order differential of the reflection signal by the differential processing unit and based on a rising characteristic of a second-order-differential reflection obtained by second order differential of the reflection signal by the differential processing unit; and
an arithmetic unit configured to, in response to a determination of the waveform determining unit, calculate and output a distance to the target measured object based on the reflection signal.

22. A scanning rangefinder comprising:
a light emitting unit configured to output a pulse measurement beam;
a scanning unit to periodically scan the measurement beam output from the light emitting unit in a deflected manner to a measurement target space through an optical window;
a light receiving unit configured to detect a reflected beam including a plurality of overlapping reflected beams reflected from a plurality of measured objects including a target measured object present in the measurement target space, and to output a reflection signal corresponding to the reflected beam; and
the signal processing configured to process the reflection signal output from the light receiving unit, and to calculate and output a distance to the target measured object, the signal processing apparatus including:
a differential processing unit configured to differentiate the reflection signal output from the light receiving unit;
a waveform determining unit configured to determine whether the reflected beam includes a plurality of overlapping reflected beams reflected from a plurality of measured objects including the target measured object based on a rising characteristic and a falling characteristic of a first-order-differential reflection signal obtained by first order differential of the reflection signal by the differential processing unit and based on a rising characteristic of a second-order-differential reflection signal obtained by second order differential of the reflection signal by the differential processing unit;
a signal separating unit configured to separate the reflection signal with reference to a second rise time or the subsequent rise time on the second-order-differential reflection signal when the waveform determining unit determines that the reflected beam includes the plurality of overlapping reflected beams reflected from the plurality of measured objects; and
an arithmetic unit configured to calculate a barycentric position of the first-order-differential reflection signal for the reflection signal separated by the signal separating unit with reference to the second rise time or the subsequent rise time on the second-order-differential reflection signal, to obtain a time corresponding to the barycentric position as a detection time of the reflected beam, and to calculate and output a distance to the target measured object based on a time difference between an output time of the measurement beam and the detection time of the reflected beam.

23. A scanning rangefinder comprising:
a light emitting unit configured to output a pulse measurement beam;
a scanning unit to periodically scan the measurement beam output from the light emitting unit in a deflected manner to a measurement target space through an optical window;

a light receiving unit configured to detect a reflected beam including a plurality of overlapping reflected beams reflected from a plurality of measured objects including the target measured object present in the measurement target space, and to output a reflection signal corresponding to the reflected beam; and the signal processing apparatus configured to process the reflection signal output from the light receiving unit, and to calculate and output a distance to the target measured object, the signal processing apparatus including:

a differential processing unit configured to differentiate the reflection signal output from the light receiving unit;

a waveform determining unit configured to determine whether the reflected beam includes a plurality of overlapping reflected beams reflected from a plurality of measured objects including the target measured object based on a rising characteristic and a falling characteristic of a first-order-differential reflection signal obtained by first order differential of the reflection signal by the differential processing unit and based on a rising characteristic of a second-order-differential reflection signal obtained by second order differential of the reflection signal by the differential processing unit; and an arithmetic unit configured to in response to a determination of the waveform determining unit, calculate a distance to the target measured object based on the reflection signal, and to output the distance only when the distance calculated for the measurement beam scanned in a deflected manner by a scanning unit in one same direction falls within a predetermined allowable range in a plurality of periods.

* * * * *

UNITED STATES PATENT AND TRADEMARK OFFICE
CERTIFICATE OF CORRECTION

PATENT NO. : 8,831,908 B2
APPLICATION NO. : 13/075668
DATED : September 9, 2014
INVENTOR(S) : Toshihiro Kamitani et al.

It is certified that error appears in the above-identified patent and that said Letters Patent is hereby corrected as shown below:

In the Claims

Claim 21, Column 21, lines 42-67 to Column 22, lines 1-10, should be deleted and insert therefor:

--A scanning rangefinder comprising:
a light emitting unit configured to output a pulse measurement beam;
a scanning unit to periodically scan the measurement beam output from the light emitting unit in a deflected manner to a measurement target space through an optical window;
a light receiving unit configured to detect a reflected beam including a plurality of overlapping reflected beams reflected from a plurality of measured objects including a target measured object present in the measurement target space, and to output a reflection signal corresponding to the reflected beam; and
a signal processing apparatus configured to process the reflection signal output from the light receiving unit and to calculate and output a distance to the target measured object, the signal processing apparatus including:
a differential processing unit configured to differentiate the reflection signal output from the light receiving unit;
a waveform determining unit configured to determine whether the reflected beam includes a plurality of overlapping reflected beams reflected from a plurality of measured objects including the target measured object based on a rising characteristic and a falling characteristic of a first-order-differential reflection signal obtained by first order differential of the reflection signal by the differential processing unit and based on a rising characteristic of a second-order-differential reflection obtained by second order differential of the reflection signal by the differential processing unit; and
an arithmetic unit configured to, in response to a determination of the waveform determining unit, calculate and output a distance to the target measured object based on the reflection signal.--

Signed and Sealed this
Fourteenth Day of April, 2015

Michelle K. Lee
*Director of the United States Patent and Trademark Office*

CERTIFICATE OF CORRECTION (continued)
U.S. Pat. No. 8,831,908 B2

In the Claims

Claim 22, Column 22, lines 11-60, should be deleted and insert therefor:

--A scanning rangefinder comprising:
a light emitting unit configured to output a pulse measurement beam;
a scanning unit to periodically scan the measurement beam output from the light emitting unit in a deflected manner to a measurement target space through an optical window;
a light receiving unit configured to detect a reflected beam including a plurality of overlapping reflected beams reflected from a plurality of measured objects including a target measured object present in the measurement target space, and to output a reflection signal corresponding to the reflected beam; and
a signal processing apparatus configured to process the reflection signal output from the light receiving unit, and to calculate and output a distance to the target measured object, the signal processing apparatus including:
a differential processing unit configured to differentiate the reflection signal output from the light receiving unit:
a waveform determining unit configured to determine whether the reflected beam includes a plurality of overlapping reflected beams reflected from a plurality of measured objects including the target measured object based on a rising characteristic and a falling characteristic of a first-order-differential reflection signal obtained by first order differential of the reflection signal by the differential processing unit and based on a rising characteristic of a second-order-differential reflection signal obtained by second order differential of the reflection signal by the differential processing unit;
a signal separating unit configured to separate the reflection signal with reference to a second rise time or the subsequent rise time on the second-order-differential reflection signal when the waveform determining unit determines that the reflected beam includes the plurality of overlapping reflected beams reflected from the plurality of measured objects; and
an arithmetic unit configured to calculate a barycentric position of the first-order-differential reflection signal for the reflection signal separated by the signal separating unit with reference to the second rise time or the subsequent rise time on the second-order-differential reflection signal, to obtain a time corresponding to the barycentric position as a detection time of the reflected beam, and to calculate and output a distance to the target measured object based on a time difference between an output time of the measurement beam and the detection time of the reflected beam.--

CERTIFICATE OF CORRECTION (continued)
U.S. Pat. No. 8,831,908 B2

In the Claims

Claim 23, Column 22, lines 61-67 to Column 23, lines 1-17 and Column 24, lines 1-16, should be deleted and insert therefor:

--A scanning rangefinder comprising:
a light emitting unit configured to output a pulse measurement beam;
a scanning unit to periodically scan the measurement beam output from the light emitting unit in a deflected manner to a measurement target space through an optical window;
a light receiving unit configured to detect a reflected beam including a plurality of overlapping reflected beams reflected from a plurality of measured objects including the target measured object present in the measurement target space, and to output a reflection signal corresponding to the reflected beam; and
a signal processing apparatus configured to process the reflection signal output from the light receiving unit, and to calculate and output a distance to the target measured object, the signal processing apparatus including:
a differential processing unit configured to differentiate the reflection signal output from the light receiving unit;
a waveform determining unit configured to determine whether the reflected beam includes a plurality of overlapping reflected beams reflected from a plurality of measured objects including the target measured object based on a rising characteristic and a falling characteristic of a first-order-differential reflection signal obtained by first order differential of the reflection signal by the differential processing unit and based on a rising characteristic of a second-order-differential reflection signal obtained by second order differential of the reflection signal by the differential processing unit; and
an arithmetic unit configured to, in response to a determination of the waveform determining unit, calculate a distance to the target measured object based on the reflection signal, and to output the distance only when the distance calculated for the measurement beam scanned in a deflected manner by a scanning unit in one same direction falls within a predetermined allowable range in a plurality of periods.--